(12) United States Patent
Kanetake et al.

(10) Patent No.: US 11,688,173 B2
(45) Date of Patent: Jun. 27, 2023

(54) ROAD SHAPE DETERMINATION METHOD

(71) Applicant: FUJITSU LIMITED, Kawasaki (JP)

(72) Inventors: Jun Kanetake, Kawasaki (JP); Yasuto Watanabe, Machida (JP)

(73) Assignee: FUJITSU LIMITED, Kawasaki (JP)

(*) Notice: Subject to any disclaimer, the term of this patent is extended or adjusted under 35 U.S.C. 154(b) by 89 days.

(21) Appl. No.: 17/214,497

(22) Filed: Mar. 26, 2021

(65) Prior Publication Data
US 2021/0334554 A1 Oct. 28, 2021

(30) Foreign Application Priority Data

Apr. 28, 2020 (JP) .................. 2020-078978

(51) Int. Cl.
G06V 20/56 (2022.01)
G06V 10/25 (2022.01)

(52) U.S. Cl.
CPC .............. G06V 20/56 (2022.01); G06V 10/25 (2022.01); G06V 20/588 (2022.01)

(58) Field of Classification Search
CPC ...... G06V 20/588; G06V 10/44; G06V 20/20; G06V 20/64; G06V 40/16; G06V 20/46; G06V 40/172; G06V 20/44; G06V 40/20; G06T 7/11; G06T 1/0014; G06T 7/70; G06T 7/20; G06T 2207/30196; G06T 2207/10016; G06T 2207/30201; G05B 19/4061; H04N 7/185; H04N 7/188; G08B 21/22
See application file for complete search history.

(56) References Cited

U.S. PATENT DOCUMENTS

2021/0269037 A1* 9/2021 Murphy ............... G06V 20/588

FOREIGN PATENT DOCUMENTS

| JP | 05-173637 A | 7/1993 |
| JP | 09-243389 A | 9/1997 |
| JP | 2001-331787 A | 11/2001 |
| JP | 2014-089137 A | 5/2014 |
| WO | WO 2017/034679 A1 | 3/2017 |

OTHER PUBLICATIONS

Extended European Search Report issued by the European Patent Office corresponding to European Patent Application No. 21165876.0 dated Sep. 10, 2021.

Crisman, Jill D., et al., "Scarf: A Color Vision System that Tracks Roads and Intersections", IEEE Transactions on Robotics and Automation, pp. 49-58, vol. 9, No. 1, IEEE Inc., New York, NY, Feb. 1, 1993.

(Continued)

Primary Examiner — Vincent Rudolph
Assistant Examiner — Hernan Arias
(74) Attorney, Agent, or Firm — ArentFox Schiff LLP

(57) ABSTRACT

A road shape determination method that causes a computer to execute a process, the process includes identifying a road region in an image captured by an imaging device mounted over a moving object, and determining a road shape based on a ratio of the road region in each of a plurality of determination regions that is set in the image in which the road region is identified.

10 Claims, 17 Drawing Sheets

(56) References Cited

OTHER PUBLICATIONS

Chen, Yu-Kumg, et al., "Pavement Detection in YCbCr Color Space and Its Application", 2015 IEEE International Conference on Information and Automation, pp. 663-667, IEEE, Aug. 8, 2015.
Yi, Yang, et al., "Intersection Scan Model and Probability Inference for Vision Based Small-scale Urban Intersection Detection", 2017 IEEE Intelligent Vehicles Symposium (IV), pp. 1393-1398, Jun. 11-14, 2017.
Ballardini, Augusto, et al., "An Online Probabilistic Road Intersection Detector", 2017 IEEE International Conference on Robotics and Automation (ICRA), pp. 239-246, May 29, 2017.
Communication pursuant to Article 94(3) EPC of European Patent Application No. 21165876.0 dated Apr. 24, 2023, 6 pages.

\* cited by examiner

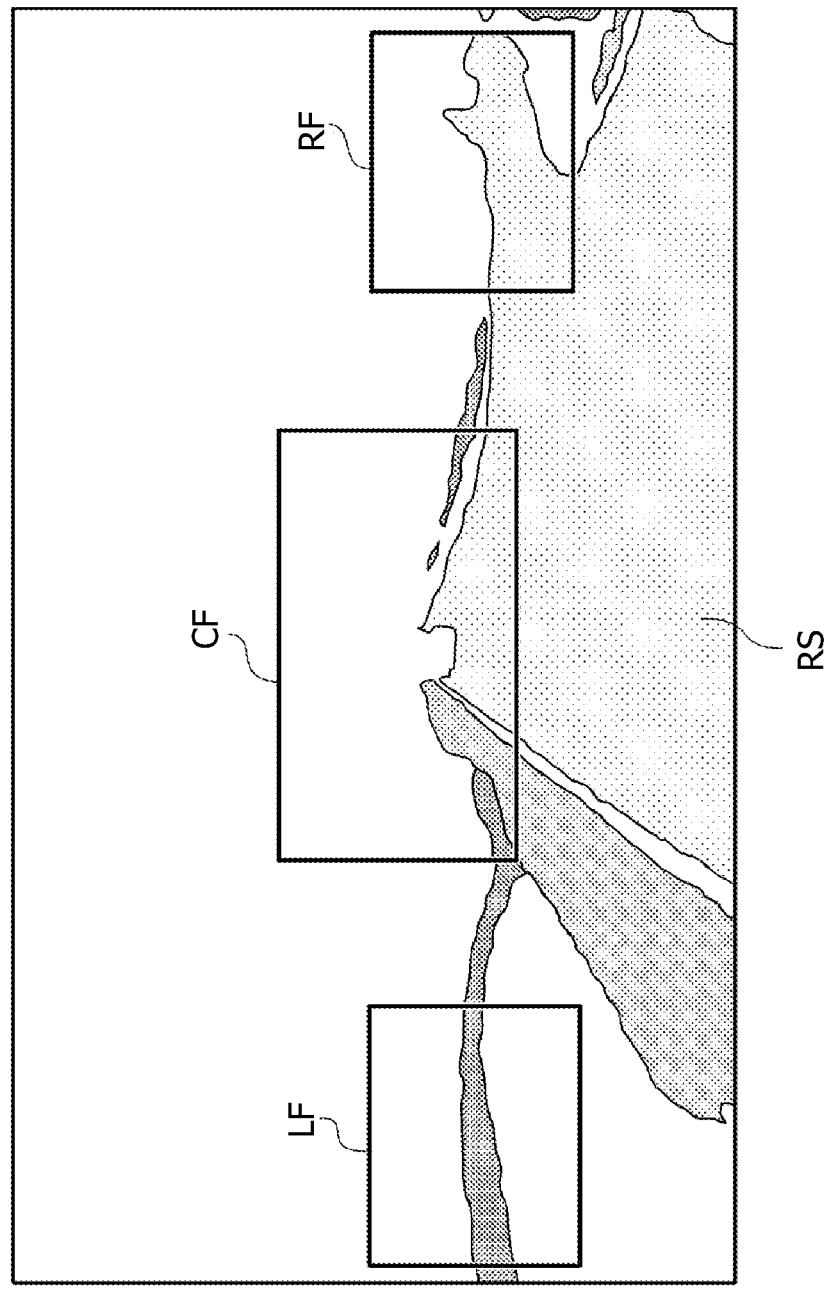

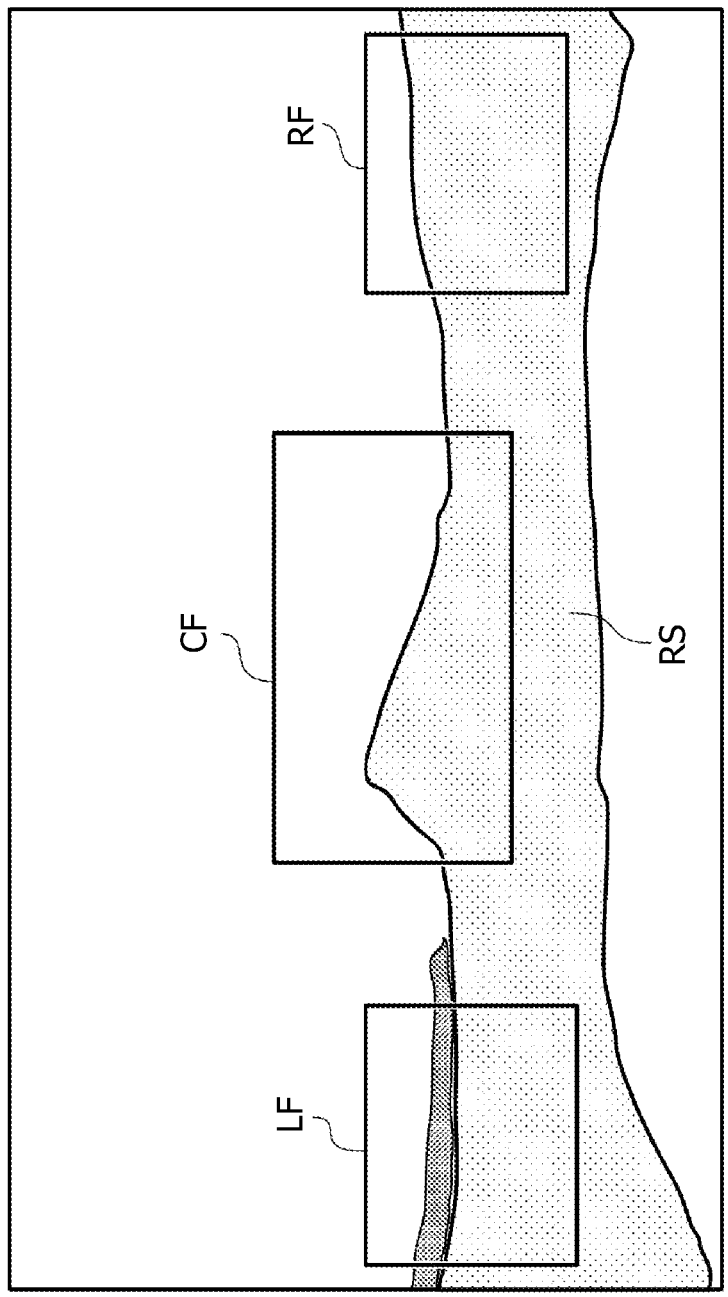

FIG. 6

| | | | | | | | |
|---|---|---|---|---|---|---|---|
| STRAIGHT ROAD | ✓ | ✓ | ✓ | ✓ | ✓ | × | × | × |
| RIGHT TURN ROAD | ✓ | ✓ | × | ✓ | × | ✓ | × | × |
| LEFT TURN ROAD | ✓ | × | ✓ | ✓ | × | × | ✓ | × |
| ROAD SHAPE | CROSSROAD | T-SHAPED ROAD | T-SHAPED ROAD | T-SHAPED ROAD | STRAIGHT ROAD | STRAIGHT ROAD | STRAIGHT ROAD | DEAD END |
| TRAVELING DIRECTION | STRAIGHT TRAVELLING LEFT TURN RIGHT TURN | STRAIGHT TRAVELLING RIGHT TURN | STRAIGHT TRAVELLING LEFT TURN | — LEFT TURN RIGHT TURN | STRAIGHT TRAVELLING | RIGHT TURN | LEFT TURN | — |
| | | | | PATTERN | | | | |

FIG. 7

| IMAGE | SEGMENT | DETERMINATION REGIONS | LEFT TURN | STRAIGHT TRAVELLING | RIGHT TURN | ROAD SHAPE | TRAVELING DIRECTION |
|---|---|---|---|---|---|---|---|
| | | | × | ✓ | × | STRAIGHT ROAD | STRAIGHT TRAVELLING |
| | | | × | ✓ | ✓ | T-SHAPED ROAD | STRAIGHT TRAVELLING (RIGHT TURN) |
| | | | ✓ | × | ✓ | T-SHAPED ROAD | (LEFT TURN) (RIGHT TURN) |
| | | | ✓ | ✓ | ✓ | CROSSROAD | STRAIGHT TRAVELLING (LEFT TURN) (RIGHT TURN) |

ROAD SHAPE DETERMINATION METHOD

CROSS-REFERENCE TO RELATED APPLICATION

This application is based upon and claims the benefit of priority of the prior Japanese Patent Application No. 2020-78978, filed on Apr. 28, 2020, the entire contents of which are incorporated herein by reference.

FIELD

An embodiment discussed herein is related to a road shape determination method.

BACKGROUND

There is a technique for capturing, by a camera mounted on a vehicle, an image of a scenery along a traveling road in front of the vehicle and detecting, as an intersection, an edge vanishing point at which continuity of a left edge or a right edge of the traveling road in the captured scenery image is interrupted.

Examples of the related art include Japanese Laid-open Patent Publication No. 09-243389.

SUMMARY

According to an aspect of the embodiments, a road shape determination method that causes a computer to execute a process, the process includes identifying a road region in an image captured by an imaging device mounted over a moving object, and determining a road shape based on a ratio of the road region in each of a plurality of determination regions that is set in the image in which the road region is identified.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 illustrates a road region identified by semantic segmentation;

FIG. 5 illustrates a road region identified by semantic segmentation;

FIG. 6 illustrates determination patterns of road shapes such as a straight road, a right turn road, and a left turn road;

FIG. 7 illustrates a display screen displaying a road shape determination result;

DESCRIPTION OF EMBODIMENTS

In the related art, in a scenery image obtained by capturing, by a camera mounted on a vehicle, an image of a scenery along a traveling road in front of the vehicle, a pixel whose luminance difference from adjacent pixels is equal to or greater than a threshold value is detected as an edge. However, since an outline such as a sidewalk, a roadside strip, a road surface paint, and a shadow as well as a road boundary is detected as an edge, it is difficult to appropriately combine edges representing the road boundary. As a result, the road boundary may not be appropriately identified, and it may be difficult to appropriately determine the road shape such as an intersection.

Hereinafter, an embodiment of a technique capable of improving the accuracy of the road shape determination will be described with reference to the drawings.

Figure 1:
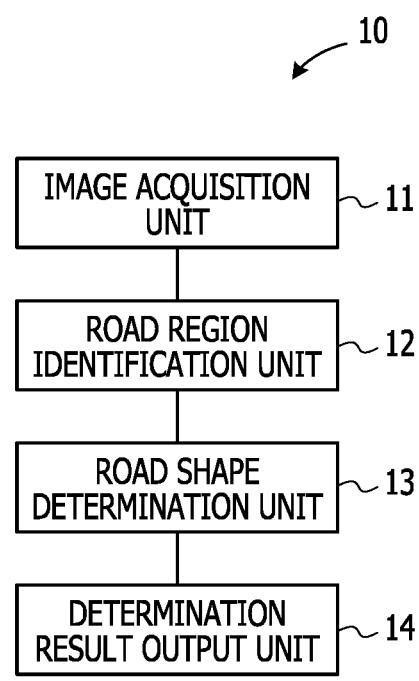
FIG. 1 illustrates a functional block diagram of a road shape determination apparatus according to this embodiment.

FIG. 1 is an example of a functional block diagram of a road shape determination apparatus 10 according to the embodiment. The road shape determination apparatus 10 includes an image acquisition unit 11, a road region identification unit 12, a road shape determination unit 13, and a determination result output unit 14. For example, the road shape determination apparatus 10 is disposed in a moving object, such as a vehicle, which travels on a road.

The image acquisition unit 11 acquires an image captured by an imaging device installed in a front portion of the moving object to face a traveling direction. When the image is analog information, the image acquisition unit 11 converts the analog information into digital information.

Figure 2:
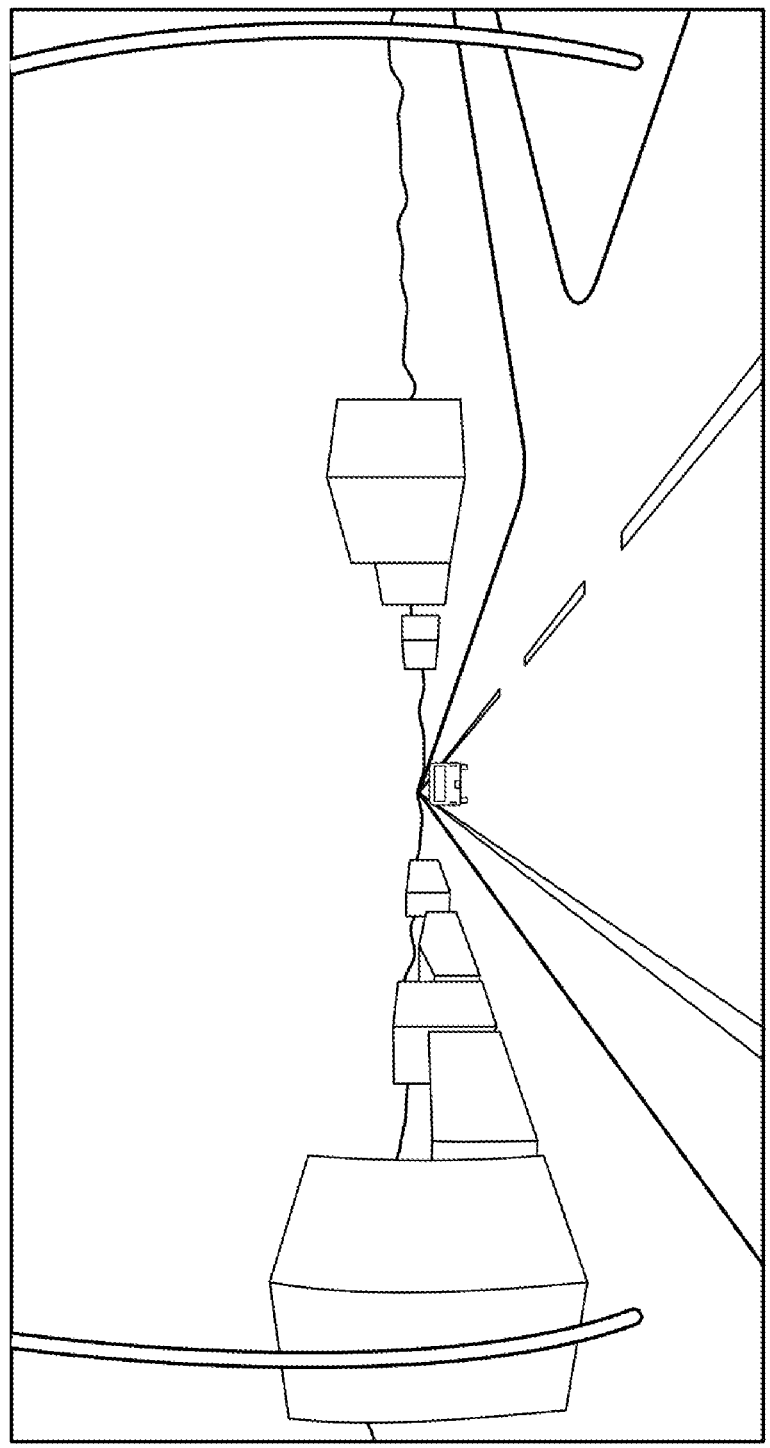
FIG. 2 illustrates an image captured by an imaging device.

The imaging device may be, for example, a wide-angle camera of a drive recorder. FIG. 2 illustrates an image captured by the wide-angle camera. In the image captured by the wide-angle camera, distortion caused in the image increases as a position in the image moves toward the outside from the center of the image. For example, a real horizontal line that exists on a lower side than a height of the center of the image has an arc shape in which opposite ends of the horizontal line goes up and the center of the horizontal line goes down.

The road region identification unit 12 inputs captured image information to a model which is trained in advance to identify a road region, and identifies the road region by using semantic segmentation. The semantic segmentation is processing of classifying individual pixels into categories to segment an image into respective categories.

Figure 3:
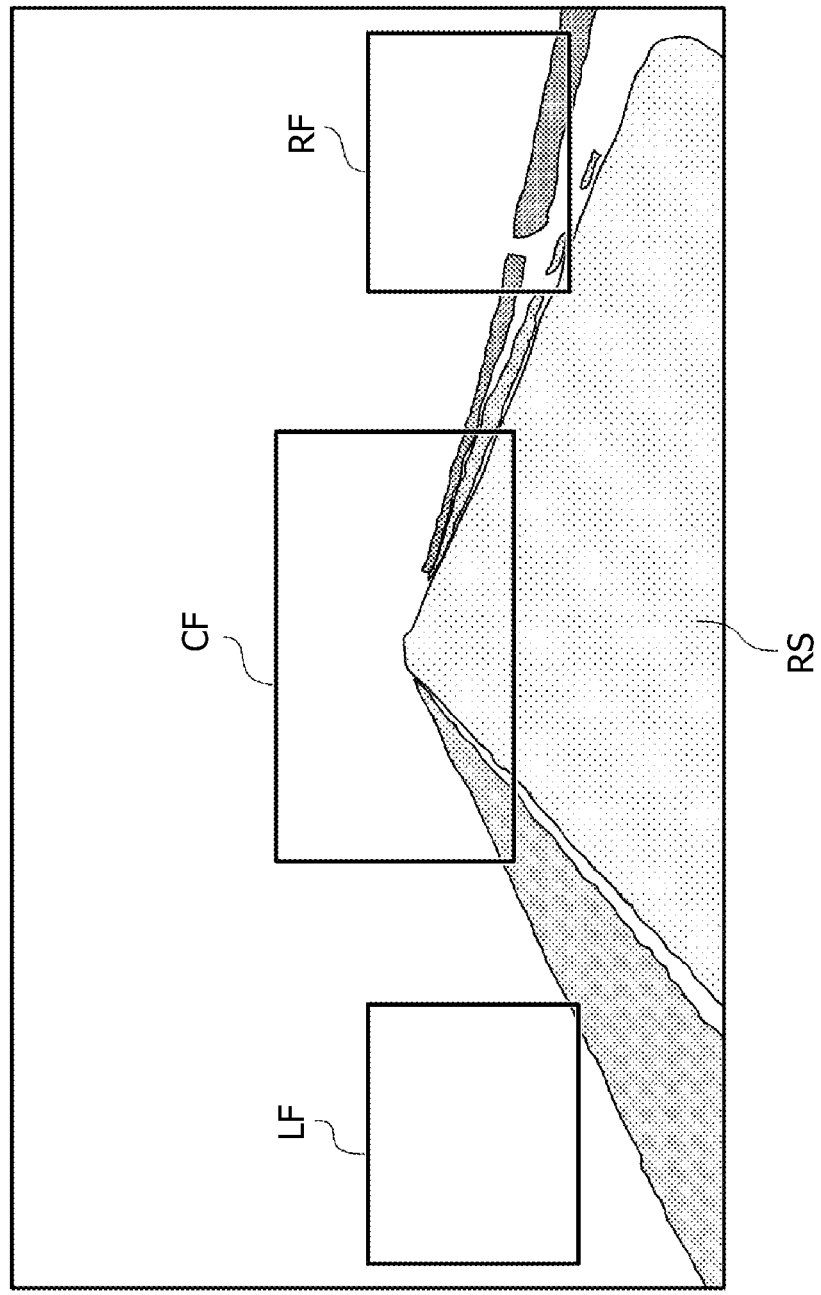
FIG. 3 illustrates a road region identified by semantic segmentation.

Segments generated by the semantic segmentation are illustrated in FIGS. 3 to 5. In FIGS. 3 to 5, the segments are indicated by different patterns for respective categories. A segment RS represents a segment of a road category. For example, segments indicated by patterns different from the pattern of the segment RS represent segments such as a roadside strip category and a tree category.

The road shape determination unit 13 determines a road shape based on the identified road region. Examples of the road shape include a straight road, a T-shaped road, and a crossroad. The road shape determination unit 13 sets a straight road determination region CF for determining whether or not there is a straight road, a left turn road determination region LF for determining whether or not there is a left turn road, and a right turn road determination region RF for determining whether or not there is a right turn road. The straight road determination region CF is an example of a first determination region. The left turn road determination region LF is an example of a second determination region. The right turn road determination region RF is an example of a third determination region.

The pixels of the segment RS in FIG. 3 occupy a predetermined ratio or more of the straight road determination region CF. Therefore, the pixels of the segment RS are determined to be a straight road in FIG. 3. The pixels of the segment RS in FIG. 4 occupy a predetermined ratio or more of each of the straight road determination region CF and the right turn road determination region RF. Therefore, it is determined to be a T-shaped road including a straight road and a right turn road in FIG. 4.

The pixels of the segment RS in FIG. 5 occupy a predetermined ratio or more of each of the straight road determination region CF, the left turn road determination region LF, and the right turn road determination region RF. Therefore, it is determined to be a crossroad including a straight road, a left turn road, and a right turn road in FIG. 5.

FIG. 6 illustrates determination patterns of road shapes. A case where a determination region includes a predetermined ratio or more of pixels of the segment RS is represented by a check mark, and a case where the determination region does not include a predetermined ratio or more of pixels of the segment RS is represented by an X mark.

When each of the straight road determination region, the right turn road determination region, and the left turn road determination region includes a predetermined ratio or more of pixels of the segment RS, the road has a shape of a crossroad including the straight road, the right turn road, and the left turn road. The traveling direction of the moving object is a straight direction, and there is a possibility that the moving object turns left or right.

When each of the straight road determination region and the right turn road determination region includes a predetermined ratio or more of pixels of the segment RS, the road has a shape of a T-shaped road including the straight road and the right turn road. The traveling direction of the moving object is a straight direction, and there is a possibility that the moving object turns right.

When each of the straight road determination region and the left turn road determination region includes a predetermined ratio or more of pixels of the segment RS, the road has a shape of a T-shaped road including the straight road and the left turn road. The traveling direction of the moving object is a straight direction, and there is a possibility that the moving object turns left.

When each of the right turn road determination region and the left turn road determination region includes a predetermined ratio or more of pixels of the segment RS, the road has a shape of a T-shaped road including the right turn road and the left turn road. The traveling direction of the moving object is a direction of an end position, and there is a possibility that the moving object turns right or left.

When the straight road determination region includes a predetermined ratio or more of pixels of the segment RS, the road has a shape of the straight road. The traveling direction of the moving object is a straight direction. When the right turn road determination region includes a predetermined ratio or more of pixels of the segment RS, the road has a shape of the straight road (one main road). The traveling direction of the moving object is a right turn direction (a right curve).

When the left turn road determination region includes a predetermined ratio or more of pixels of the segment RS, the road has a shape of the straight road (one main road). The traveling direction of the moving object is a left turn direction (a left curve). When none of the straight road determination region, the right turn road determination region, and the left turn road determination region include a predetermined ratio or more of pixels of the segment RS, the road has a shape of a dead end.

For example, the determination result output unit 14 displays the determined road shape on a display device such as a display. FIG. 7 illustrates an example of the display screen. The display screen includes, for example, a camera image that is an image captured by a camera, a segment acquired by the semantic segmentation, and determination regions. The display screen also includes a mark indicating whether or not each of the left turn road determination region, the straight road determination region, and the right turn road determination region include a predetermined ratio or more of pixels of the segment RS, the determined road shape, and the traveling direction of the moving object.

Figure 8:
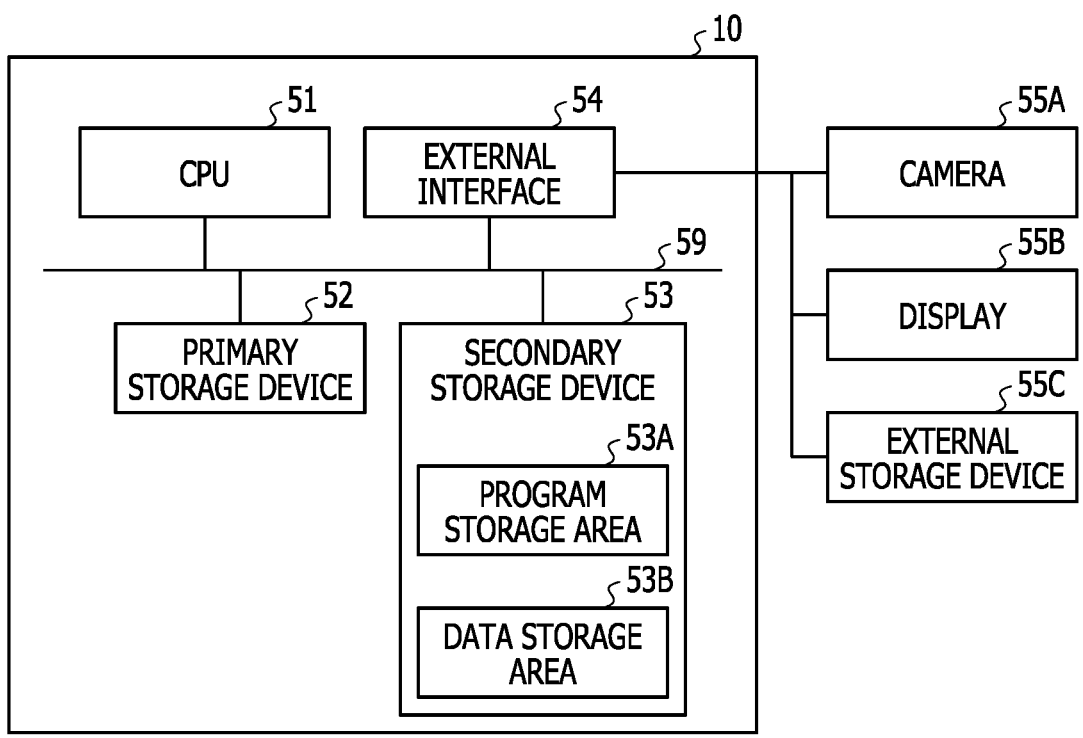
FIG. 8 illustrates a hardware configuration diagram of the road shape determination apparatus according to this embodiment.

FIG. 8 is an example of a hardware configuration diagram of the road shape determination apparatus according to the embodiment.

As illustrated in FIG. 8, as an example, the road shape determination apparatus 10 includes a central processing unit (CPU) 51, a primary storage device 52, a secondary storage device 53, and an external interface 54. The CPU 51 is an example of a processor which is hardware. The CPU 51, the primary storage device 52, the secondary storage device 53, and the external interface 54 are coupled to another via a bus 59. A graphics processing unit (GPU) may be used instead of the CPU.

The primary storage device 52 is, for example, a volatile memory such as a random-access memory (RAM). The secondary storage device 53 is, for example, a nonvolatile memory such as a hard disk drive (HDD) or a solid-state drive (SSD).

The secondary storage device 53 includes a program storage area 53A and a data storage area 53B. As an example, the program storage area 53A stores a road shape determination program. As an example, the data storage area 53B stores intermediate data or the like that is generated when the road shape determination program is executed.

The CPU 51 reads the road shape determination program from the program storage area 53A, and loads the read program in the primary storage device 52. The CPU 51 loads and executes the road shape determination program, thereby operating as the image acquisition unit 11, the road region identification unit 12, the road shape determination unit 13, and the determination result output unit 14 in FIG. 1.

The road shape determination program may be stored in an external server and loaded in the primary storage device 52 via a network. The road shape determination program may be stored in a non-transitory recording medium such as a digital versatile disc (DVD) and loaded in the primary storage device 52 via a recording medium reading device.

An external device is coupled to the external interface 54. The external interface 54 manages transmission and reception of various kinds of information between the external device and the CPU 51. FIG. 8 illustrates an example in which a camera 55A which is an example of the imaging device, a display 55B which is an example of the display device, and an external storage device 55C are coupled to the external interface 54.

The display 55B may be built in the road shape determination apparatus 10, and any or all of the camera 55A, the display 55B, and the external storage device 55C may be disposed at a location separate from the road shape determination apparatus 10 via the network.

The road shape determination apparatus 10 may be, for example, a dedicated apparatus, or may be a personal computer, or a tablet computer. The road shape determination apparatus 10 may be installed in the moving object, or may be a server or a cloud coupled to a camera installed in the moving object via a wireless network. An image captured by the camera mounted on the moving object may be transmitted to the server or the cloud via the wireless network, and the road shape determination processing may be performed in the server or the cloud.

Figure 9:
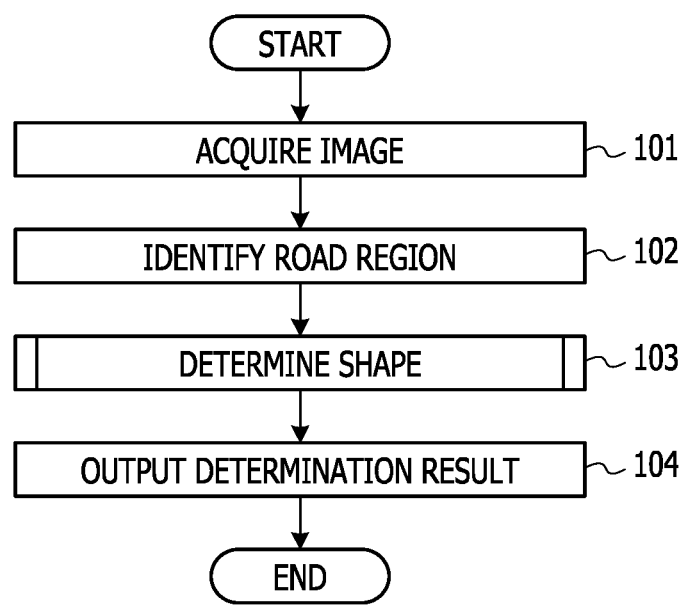
FIG. 9 illustrates a flowchart of road shape determination processing according to this embodiment.

FIG. 9 illustrates a flowchart of the road shape determination processing. In operation 101, the CPU 51 acquires an image captured by the camera 55A disposed in the front portion of the vehicle and facing in the vehicle traveling direction. In operation 102, the CPU 51 identifies a road region from the segment acquired by the semantic segmentation.

In operation 103, the CPU 51 determines a road shape from an identified road region, which will be described later. In operation 104, the CPU 51 outputs the determined road shape to the display 55B. The road shape determination processing may be performed at predetermined time intervals. The predetermined time intervals may be, for example, 1/60 seconds.

Figure 10:
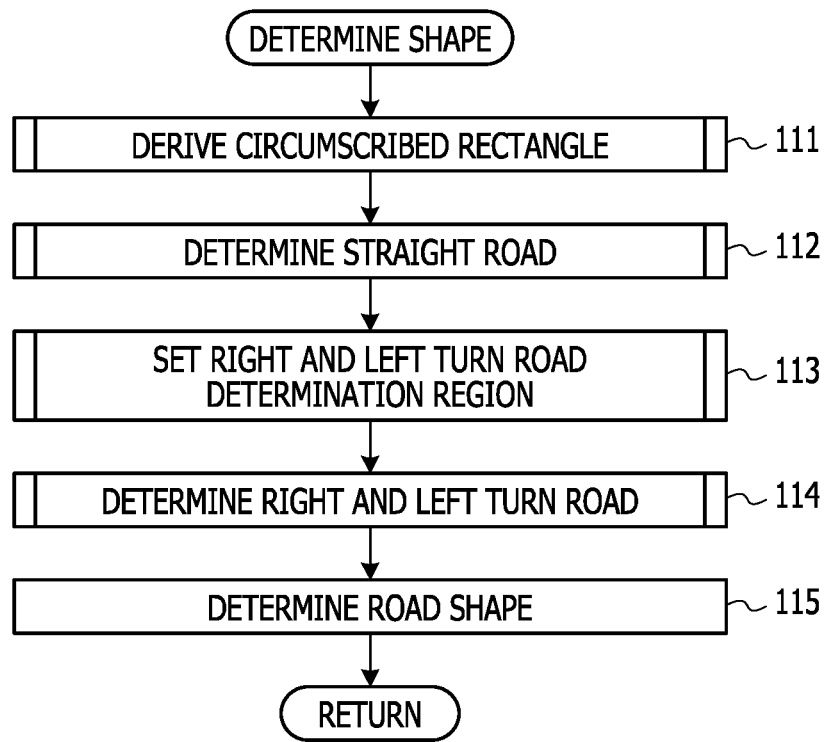
FIG. 10 illustrates a flowchart of road shape determination processing according to this embodiment.

FIG. 10 illustrates a flowchart of a flow of road shape determination processing of operation 103 in FIG. 9. In operation 111, the CPU 51 performs circumscribed rectangle derivation processing of deriving a circumscribed rectangle of the road region. In operation 112, the CPU 51 sets a straight road determination region and performs straight road determination processing of determining whether or not there is a straight road region.

In operation 113, the CPU 51 performs right and left turn road determination region setting processing of setting a right and left turn road determination region. In operation 114, the CPU 51 performs right and left turn road determination processing of determining whether or not there is a right turn road or a left turn road by using the right and left turn road determination region. In operation 115, the CPU 51 determines the road shape and the traveling direction of the vehicle as illustrated in FIG. 6 by using the determination results obtained in operation 112 and operation 114, for example, based on the presence or absence of a straight road, a left turn road, and right turn road.

Figure 11A:
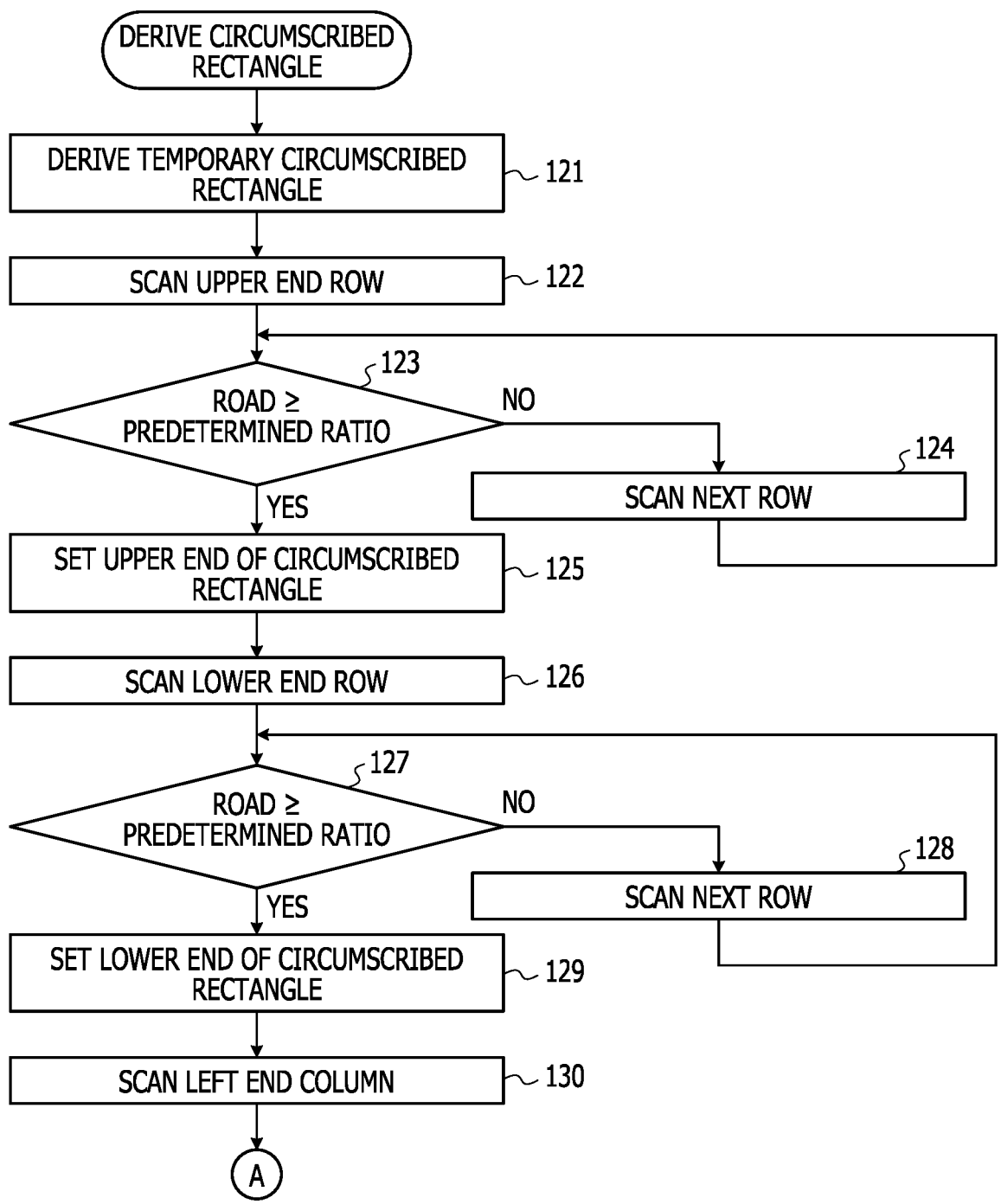
FIGS. 11A and 11B illustrate flowcharts of circumscribed rectangle derivation processing according to this embodiment.
Figure 11B:
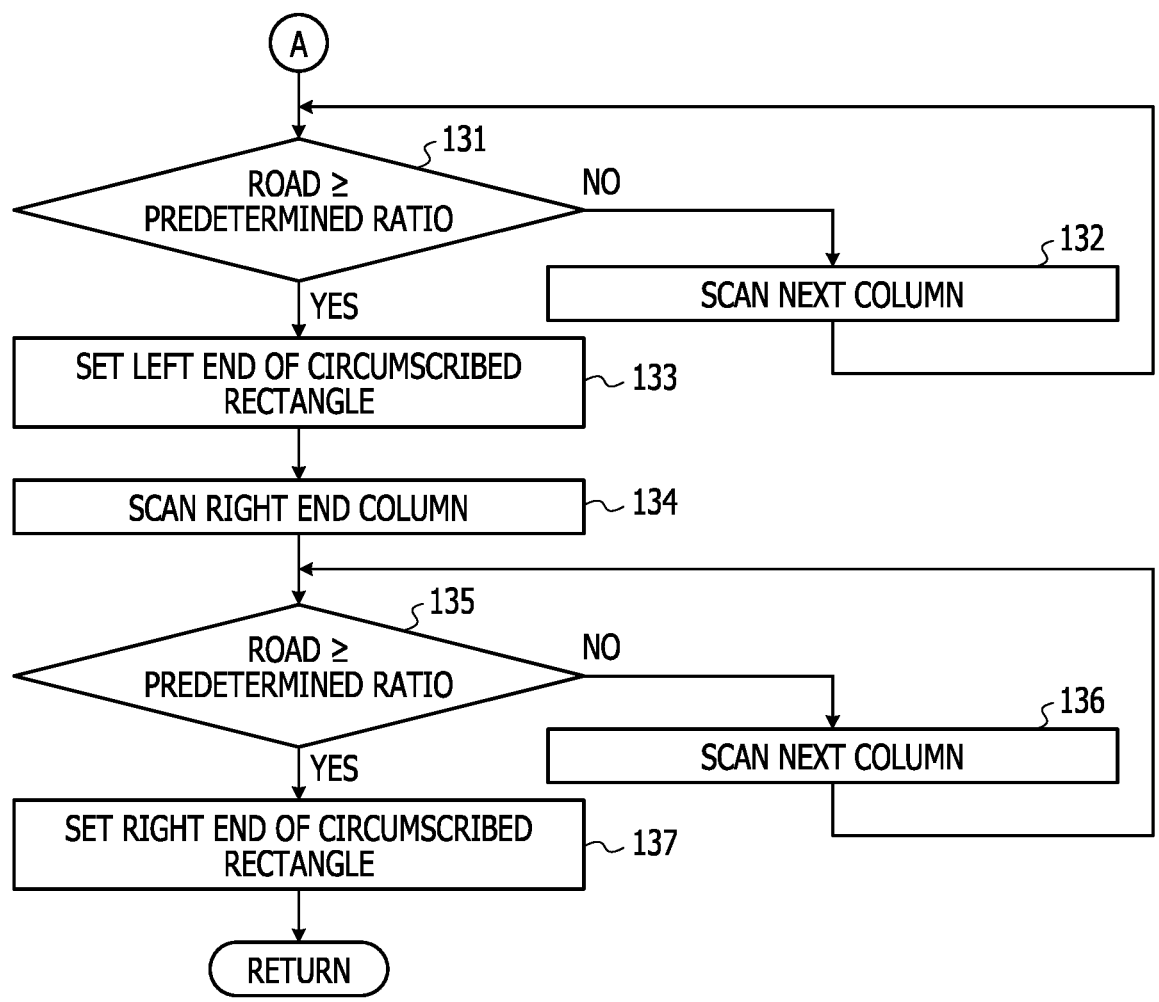

FIG. 11 illustrates a flow of the circumscribed rectangle derivation processing in operation 111 in FIG. 10. In the circumscribed rectangle derivation processing, noise around a rectangle circumscribing the road region is removed to derive a circumscribed rectangle.

In operation 121, the CPU 51 derives, as a temporary circumscribed rectangle, a rectangle circumscribing the road region identified in operation 102 in FIG. 9. For example, the CPU 51 derives, as a temporary circumscribed rectangle, a rectangle circumscribing a segment including pixels to which a label representing a road classified into the road category by the semantic segmentation is attached.

In operation 122, the CPU 51 scans an upper end row of the temporary circumscribed rectangle. In operation 123, the CPU 51 determines whether or not pixels in the road region occupy a predetermined ratio or more of a width of the temporary circumscribed rectangle. The predetermined ratio may be, for example, 10%.

When the determination in operation 123 is NO, the CPU 51 scans a next row of the temporary circumscribed rectangle, for example, a row immediately below the temporary circumscribed rectangle in operation 124, and the operation returns to operation 123. When the determination in operation 123 is YES, the CPU 51 sets a current row as an upper end row of the circumscribed rectangle in operation 125.

In operation 126, the CPU 51 scans a lower end row of the temporary circumscribed rectangle. In operation 127, the CPU 51 determines whether or not pixels in the road region occupy a predetermined ratio or more of the width of the temporary circumscribed rectangle. The predetermined ratio may be, for example, 10%.

When the determination in operation 127 is NO, the CPU 51 scans a next row of the temporary circumscribed rectangle, for example, a row immediately above the lower end row of the temporary circumscribed rectangle in operation 128, and the operation returns to operation 127. When the determination in operation 127 is YES, the CPU 51 sets a current row as a lower end row of the circumscribed rectangle in operation 129.

In operation 130, the CPU 51 scans a left end column of the temporary circumscribed rectangle. In operation 131, the CPU 51 determines whether or not pixels in the road region occupy a predetermined ratio or more of a height of the temporary circumscribed rectangle. The predetermined ratio may be, for example, 10%.

When the determination in operation 131 is NO, the CPU 51 scans the next column of the temporary circumscribed rectangle, for example, the column on immediately right side of the left end column of the temporary circumscribed rectangle in operation 132, and the operation returns to operation 131. When the determination in operation 131 is YES, the CPU 51 sets the current column as a left end column of the circumscribed rectangle in operation 133.

In operation 134, the CPU 51 scans a right end column of the temporary circumscribed rectangle. In operation 135, the CPU 51 determines whether or not pixels in the road region occupy a predetermined ratio or more of the height of the temporary circumscribed rectangle. The predetermined ratio may be, for example, 10%.

When the determination in operation 135 is NO, the CPU 51 scans a next column of the temporary circumscribed rectangle, for example, a column on immediately left side of the right end column of the temporary circumscribed rectangle in operation 136, and the operation returns to operation 135. When the determination in operation 135 is YES, the CPU 51 sets a current column as a right end column of the circumscribed rectangle in operation 137.

Figure 12:
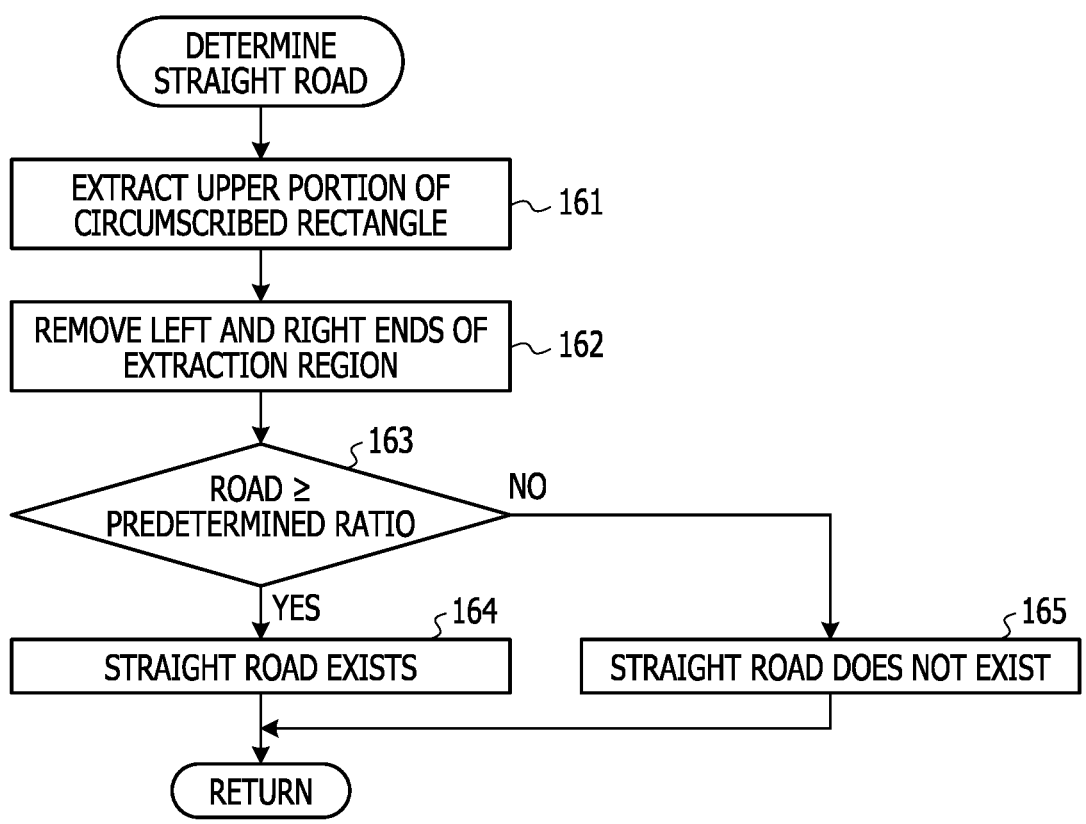
FIG. 12 illustrates a flowchart of straight road determination processing according to this embodiment.
Figure 13:
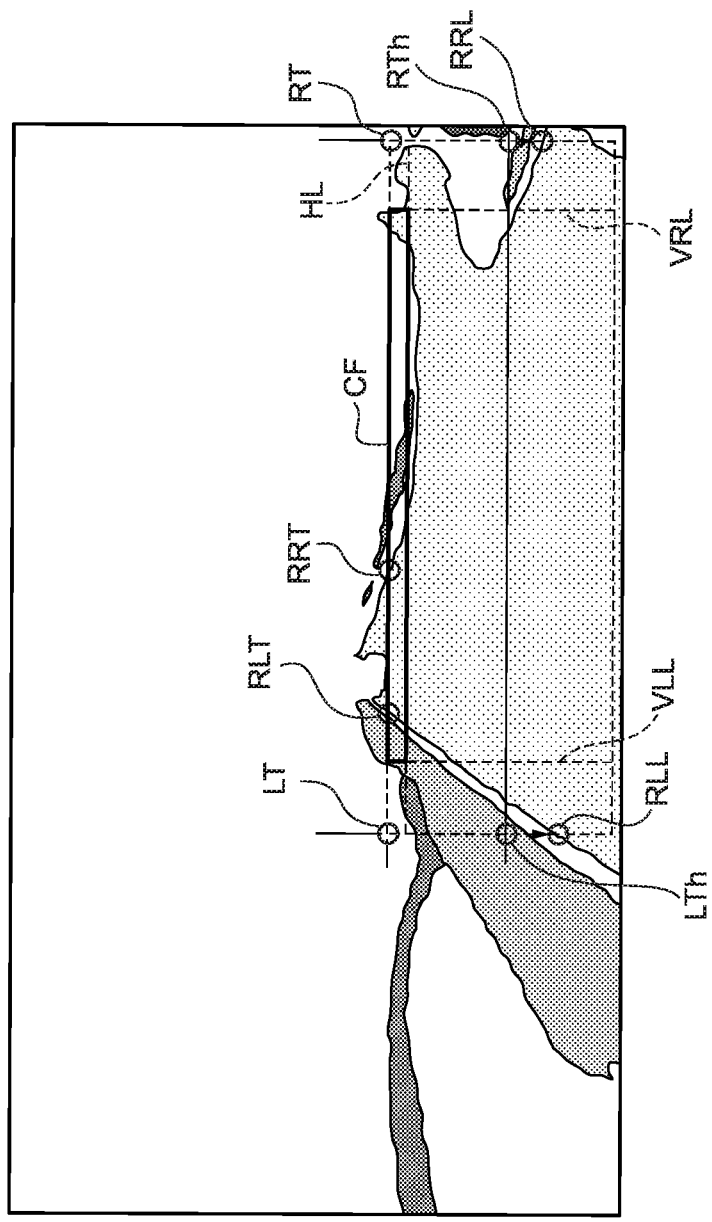
FIG. 13 is a schematic diagram for describing setting of a straight road determination region.

FIG. 12 illustrates a flowchart of a flow of the straight road determination processing in operation 112 in FIG. 10. FIG. 13 is a schematic diagram for describing setting of the straight road determination region. In the straight road determination processing, the straight road determination region is set in the circumscribed rectangle of the road region, and presence or absence of the straight road is determined.

For example, in operation 161, the CPU 51 extracts, as an extraction region, a portion below a straight line HL spaced apart from an upper side by a predetermined distance in the circumscribed rectangle, the straight line HL being parallel to the upper side of the circumscribed rectangle, from the circumscribed rectangle. The predetermined distance may be, for example, 5% of a height of the circumscribed rectangle.

In operation 162, the CPU 51 removes a left portion from a straight line VLL spaced apart from a left side by a predetermined distance in the circumscribed rectangle, the straight line VLL being parallel to the left side of the circumscribed rectangle, from the extraction region. The CPU 51 removes a right portion from a straight line VRL spaced apart from a right side by a predetermined distance in the circumscribed rectangle, the straight line VRL being parallel to the right side of the circumscribed rectangle, from the extraction region. The predetermined ratio may be, for example, 20% of the width of the circumscribed rectangle. The extraction region obtained by removing left and right ends, for example, an upper end in the width direction of the circumscribed rectangle is set as the straight road determination region CF as illustrated in FIG. 13.

In operation 163, the CPU 51 determines whether or not a ratio of the road region in the straight road determination region is equal to or higher than a predetermined ratio. The predetermined ratio may be, for example, 30% of the number of pixels in the straight road determination region.

When the determination in operation 163 is YES, the CPU 51 determines that a straight road exists in operation 164. When the determination in operation 163 is NO, the CPU 51 determines that a straight road does not exist in operation 165.

The straight road portion of a road segment is a relatively small region since the straight road portion is far away from the imaging device. However, when the imaging device is, for example, a wide-angle camera of a drive recorder, distortion increases in the image as a position in the image moves toward the outside from the center of the captured image. For example, in the image, a real horizontal line on a lower side than a height of the center of the image has an arc shape in which opposite ends of the horizontal line goes up and the center of the horizontal line goes down. In the image, since the straight road portion exists above a recess of the arc, the determination may be performed with higher accuracy in the straight road determination region.

Figure 14:
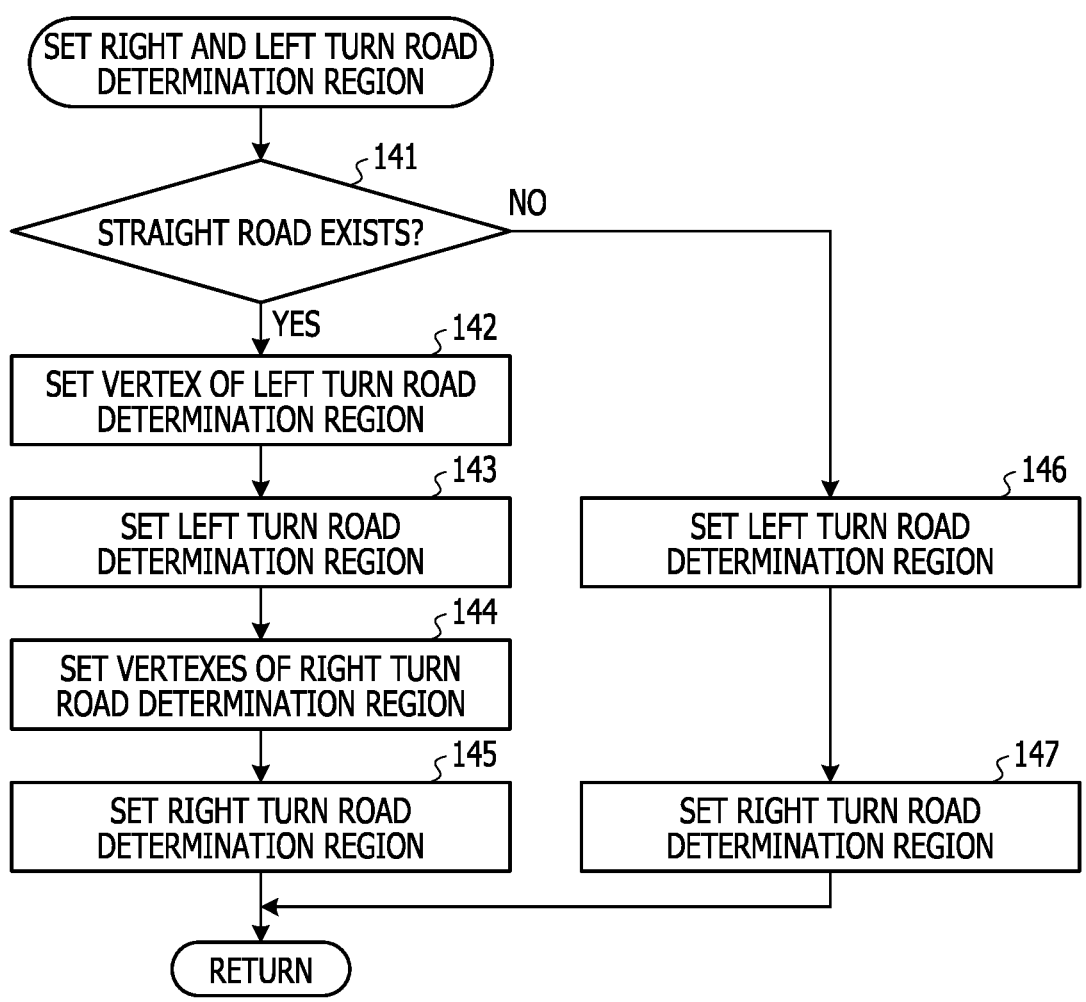
FIG. 14 illustrates a flowchart of right and left turn road determination region setting processing according to this embodiment.

FIG. 14 illustrates a flowchart of a flow of the right and left turn road determination region setting processing in operation 113 in FIG. 10. In operation 141, the CPU 51 determines whether or not a straight road exists. In operation 164 in FIG. 12, when it is determined that a straight road exists, the CPU 51 sets vertexes of a left turn road determination region in operation 142.

For example, as illustrated in FIG. 13, on the left side of the circumscribed rectangle, a reference point LTh spaced apart from a lower end by a predetermined distance is set in the circumscribed rectangle. The predetermined distance may be, for example, 50% of the height of the circumscribed rectangle. An upper end of the road region on the left side of the circumscribed rectangle, which exists below the reference point LTh, is set as a first vertex RLL.

Figure 15:
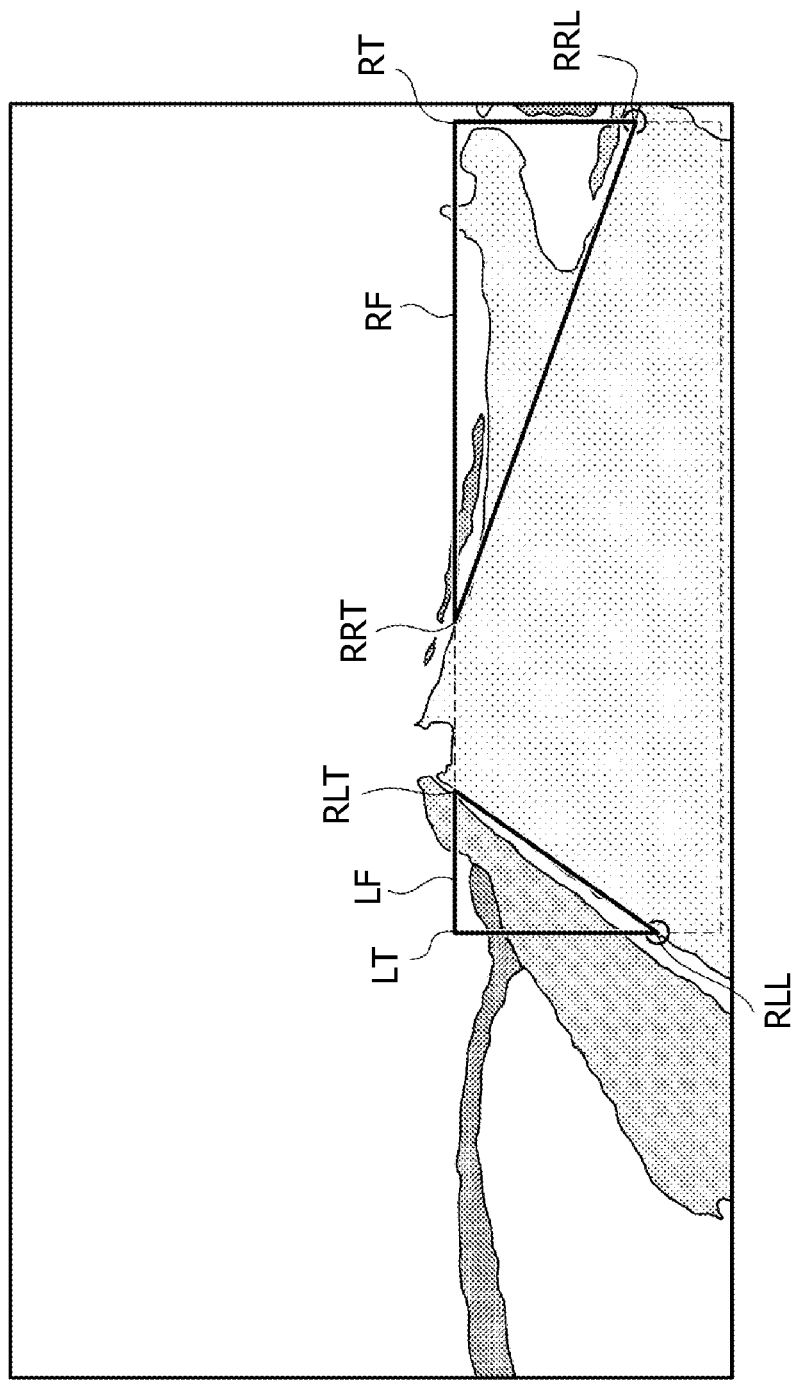
FIG. 15 is a schematic diagram for describing setting of a right and left turn road determination region.

A left end of the road region on the upper side of a straight road determination region CF is set as a second vertex RLT, and an upper left corner of the circumscribed rectangle is set as a third vertex LT. As illustrated in FIG. 15, in operation 143, the CPU 51 sets a triangle coupling the first vertex RLL, the second vertex RLT, and the third vertex LT as the left turn road determination region LF.

In operation 144, the CPU 51 sets vertexes of the right turn road determination region. For example, as illustrated in FIG. 13, on the right side of the circumscribed rectangle, a reference point RTh spaced apart from a lower end by a predetermined distance is set in the circumscribed rectangle. The predetermined distance may be, for example, 50% of the height of the circumscribed rectangle. An upper end of the road region on the right side of the circumscribed rectangle, which exists below the reference point RTh, is set as a first vertex RRL.

A right end of the road region on the upper side of the straight road determination region CF is set as a second vertex RRT, and an upper right corner of the circumscribed rectangle is set as a third vertex RT. As illustrated in FIG. 15, in operation 145, the CPU 51 sets a triangle coupling the first vertex RRL, the second vertex RRT, and the third vertex RT as the right turn road determination region RF.

When the determination in operation 141 is NO, for example, when it is determined that the straight road does not exist in operation 165 of FIG. 12, in operation 146, the CPU 51 sets a rectangle surrounded by the upper side and the left side of the circumscribed rectangle, and a first straight line and a second straight line as a left turn road determination region.

The first straight line is a straight line which is parallel to the upper side of the circumscribed rectangle and is spaced apart from the upper side by a predetermined distance in the circumscribed rectangle. The predetermined distance may be, for example, 20% of the height of the circumscribed rectangle. The second straight line is a straight line which is parallel to the left side of the circumscribed rectangle and is spaced apart from the left side by a predetermined distance in the circumscribed rectangle. The predetermined distance may be, for example, 20% of the width of the circumscribed rectangle.

In operation 147, the CPU 51 sets a rectangle surrounded by the upper side and the right side of the circumscribed rectangle, and the first straight line and a third straight line as a right turn road determination region. The third straight line is a straight line which is parallel to the right side of the circumscribed rectangle and is spaced apart from the right side by a predetermined distance in the circumscribed rectangle. The predetermined distance may be, for example, 20% of the width of the circumscribed rectangle.

Figure 16:
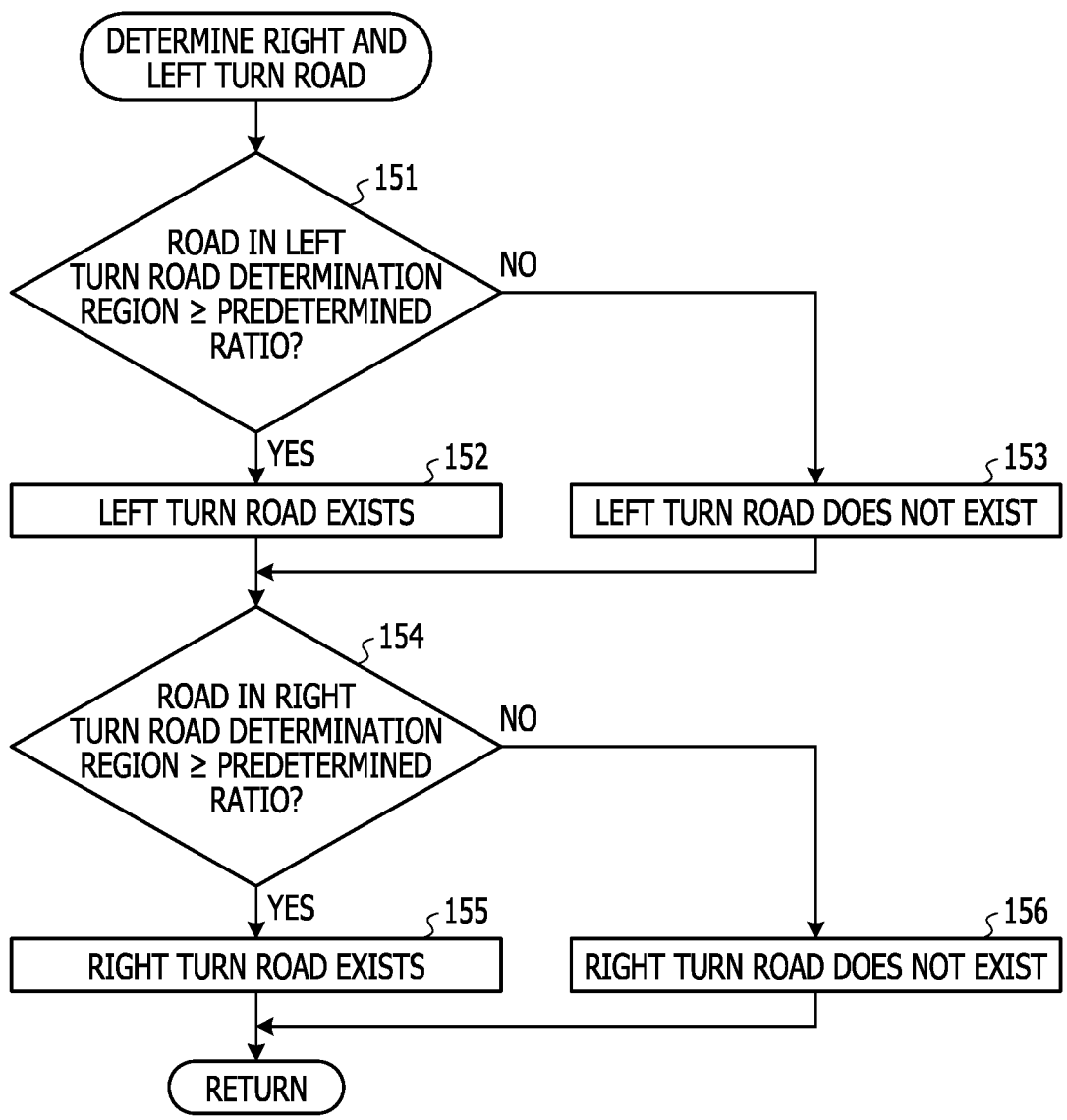
FIG. 16 illustrates a flowchart of right and left turn road determination processing according to this embodiment.

FIG. 16 illustrates a flowchart of a flow of the right and left turn road determination processing in operation 114 in FIG. 10. In operation 151, the CPU 51 determines whether or not pixels in the road region occupy a predetermined ratio or more of the left turn road determination region LF. The predetermined ratio may be, for example, 30% of the number of pixels in the left turn road determination region. When the determination in operation 151 is YES, the CPU 51 determines that a left turn road exists in operation 152. When the determination in operation 151 is NO, the CPU 51 determines that a left turn road does not exist in operation 153.

In operation 154, the CPU 51 determines whether or not pixels in the road region occupy a predetermined ratio or more of the right turn road determination region. The predetermined ratio may be, for example, 30% of the number of pixels in the right turn road determination region. When the determination in operation 154 is YES, the CPU 51 determines that a right turn road exists in operation 155. When the determination in operation 154 is NO, the CPU 51 determines that a right turn road does not exist in operation 156.

When an accident occurs, a possibility of presence or absence of an error of the driver of the vehicle equipped with the camera is determined and displayed on the display based on the road shape determined in the embodiment. This may improve work efficiency of the operator of a non-life insurance company.

When the road shape determined in the embodiment is a T-shaped or a crossroad shape, it is determined whether or not the traveling direction of the vehicle is along the center line of the traveling road surface. Accordingly, it is determined whether or not the vehicle equipped with the camera is travelling on a priority road and the determination result is displayed on the display when an accident occurs. Therefore, the work efficiency of the operator of the non-life insurance company may be improved.

In the embodiment, an image captured at a timing that is before an impact detection time obtained by an impact detection sensor mounted on the vehicle by a predetermined time, for example, an image of the location captured immediately before entry of the vehicle to the impact occurrence location may be used. Therefore, the road shape in the location where the accident occurred and the traveling direction of the vehicle may be determined.

The processing flows in the flowcharts of FIGS. 9 to 12, 14, and 16 are examples, and an order of the operations may be changed, and the operations may be added or deleted appropriately.

The road shape determination processing may be performed in real time, and, for example, the captured image may be stored in the external storage device 55C, and the road shape determination processing may be performed using the image.

The imaging device may be installed in a rear portion of the moving object and may capture an image in a direction opposite to the traveling direction. The moving object is not limited to a vehicle such as a four-wheeled vehicle or a two-wheeled vehicle, and may be, for example, a drone that travels on a road or flies along the road.

In the embodiment, an example in which the straight road, the T-shaped road, or the crossroad is determined as a road shape is described. However, for example, a Y-shaped road or a five-way intersection may be determined by appropriately setting the number of the determination regions and positions of the determination regions.

In the embodiment, the road region is identified in a captured image obtained by the imaging device mounted on the moving object. A road shape is determined based on a ratio of the road region in each of a plurality of the determination regions set in the image in which the road region is identified.

In the embodiment, accuracy of the road shape determination may be improved in this way.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A road shape determination method that causes a computer to execute a process, the process comprising:
identifying a road region in an image captured by an imaging device mounted over a moving object; and
determining a road shape based on a ratio of the road region in each of a plurality of determination regions that is set in the image in which the road region is identified,
wherein each of the plurality of determination regions includes a first determination region that is set, in a width direction, in a central upper part of a circumscribed rectangle that circumscribes the road region, a second determination region that is set in an upper left part of the circumscribed rectangle, and a third determination region that is set in an upper right part of the circumscribed rectangle.

2. The road shape determination method according to claim 1,
wherein the process determines that the road shape is:
a straight road when the ratio of the road region exceeds a predetermined value in any one of the first determination region, the second determination region, and the third determination region,
a T-shaped road when the ratio of the road region exceeds the predetermined value in any two of the first determination region, the second determination region, and the third determination region, and
a crossroad when the ratio of the road region exceeds the predetermined value in the first determination region, the second determination region, and the third determination region.

3. The road shape determination method according to claim 2, wherein:
in a case where the ratio of the road region exceeds the predetermined value in any one of the first determination region, the second determination region, and the third determination region,
the second determination region is a triangle that includes, as vertexes, an upper left corner of the circumscribed rectangle, a left end of the road region in an upper end of the first determination region, and an upper end of the road region below a predetermined height of a left side of the circumscribed rectangle, and
the third determination region is a triangle that includes, as a vertexes, an upper right corner of the circumscribed rectangle, a right end of the road region in the upper end of the first determination region, and an upper end of the road region below a predetermined height of a right side of the circumscribed rectangle.

4. The road shape determination method according to claim 2,
wherein the process determines that a traveling direction of the moving object is a straight direction when the road shape is the T-shaped road and the ratio of the road region exceeds the predetermined value in the first determination region are determined.

5. The road shape determination method according to claim 1, wherein the determined road shape is displayed on a display device.

6. A non-transitory computer-readable recording medium having stored a road shape determination program that causes a computer to execute a process, the process comprising:
identifying a road region in an image captured by an imaging device mounted over a moving object; and
determining a road shape based on a ratio of the road region in each of a plurality of determination regions that is set in the image in which the road region is identified, wherein each of the plurality of determination regions includes a first determination region that is set, in a width direction, in a central upper part of a circumscribed rectangle that circumscribes the road region, a second determination region that is set in an upper left part of the circumscribed rectangle, and a third determination region that is set in an upper right part of the circumscribed rectangle.

7. The non-transitory computer-readable recording medium according to claim 6, wherein the process determines that the road shape is:

a straight road when the ratio of the road region exceeds a predetermined value in any one of the first determination region, the second determination region, and the third determination region, a T-shaped road when the ratio of the road region exceeds the predetermined value in any two of the first determination region, the second determination region, and the third determination region, and a crossroad when the ratio of the road region exceeds the predetermined value in the first determination region, the second determination region, and the third determination region.

8. The non-transitory computer-readable recording medium according to claim 7, wherein:

in a case where the ratio of the road region exceeds the predetermined value in any one of the first determination region, the second determination region, and the third determination region, the second determination region is a triangle that includes, as vertexes, an upper left corner of the circumscribed rectangle, a left end of the road region in an upper end of the first determination region, and an upper end of the road region below a predetermined height of a left side of the circumscribed rectangle, and the third determination region is a triangle that includes, as a vertexes, an upper right corner of the circumscribed rectangle, a right end of the road region in the upper end of the first determination region, and an upper end of the road region below a predetermined height of a right side of the circumscribed rectangle.

9. The non-transitory computer-readable recording medium according to claim 7, wherein the process determines that a traveling direction of the moving object is a straight direction when the road shape is the T-shaped road and the ratio of the road region exceeds the predetermined value in the first determination region are determined.

10. The non-transitory computer-readable recording medium according to claim 6, wherein the determined road shape is displayed on a display device.

* * * * *